United States Patent
Baudson et al.

(10) Patent No.: US 9,096,354 B2
(45) Date of Patent: Aug. 4, 2015

(54) AIRCRAFT VISION SYSTEM, AND ASSOCIATED VISION METHOD

(71) Applicant: DASSAULT AVIATION, Paris (FR)

(72) Inventors: Olivier Baudson, Paris (FR); Arnaud Turpin, Boulogne (FR)

(73) Assignee: DASSAULT AVIATION, Paris (FR)

( * ) Notice: Subject to any disclaimer, the term of this patent is extended or adjusted under 35 U.S.C. 154(b) by 14 days.

(21) Appl. No.: 14/043,739

(22) Filed: Oct. 1, 2013

(65) Prior Publication Data

US 2014/0214245 A1 Jul. 31, 2014

(30) Foreign Application Priority Data

Oct. 5, 2012 (FR) ...................................... 12 02674

(51) Int. Cl.
| | |
|---|---|
| *B64D 45/00* | (2006.01) |
| *G06T 19/00* | (2011.01) |
| *B65D 45/00* | (2006.01) |

(52) U.S. Cl.
CPC .............. *B65D 45/00* (2013.01); *G06T 19/006* (2013.01)

(58) Field of Classification Search
CPC ............................... B64D 45/00; G06T 19/006
USPC .......................................................... 701/14
See application file for complete search history.

(56) References Cited

U.S. PATENT DOCUMENTS

| | | | | |
|---|---|---|---|---|
| 6,101,431 | A * | 8/2000 | Niwa et al. ....................... | 701/14 |
| 2005/0007386 | A1* | 1/2005 | Berson et al. .................. | 345/633 |
| 2005/0033475 | A1* | 2/2005 | Kuroki et al. .................. | 700/245 |
| 2009/0303082 | A1* | 12/2009 | Larson et al. .................. | 340/945 |
| 2010/0295937 | A1 | 11/2010 | Longobardi | |
| 2012/0314032 | A1* | 12/2012 | Muensterer et al. ............ | 348/46 |

FOREIGN PATENT DOCUMENTS

WO      2011/039666 A1      4/2011

OTHER PUBLICATIONS

Calhoun, Gloria, et al. "Synthetic Vision System for Improving Unmanned Aerial Vehicle Operator Situation Awareness," (May 2005), Enhanced and Synthetic Vision, SPIE, pp. 219-230.

(Continued)

*Primary Examiner* — Fadey Jabr
*Assistant Examiner* — Yazan A Soofi
(74) *Attorney, Agent, or Firm* — Davidson, Davidson & Kappel, LLC (57) ABSTRACT

The system according to the invention comprises a display and a synthetic image dynamic generating assembly. It includes a management assembly for the graphic interface of the display, capable of controlling the dynamic display, on a first region of the display, of a synthetic image and able to maintain, in certain movement configurations of the aircraft, a second region of the display delimited by the edge substantially with no synthetic surface representation of the terrain. The management assembly includes means for dynamically delimiting the edge of the first region. The delimiting means are configured to dynamically compute the position of the edge as a function of a determined visibility distance ($D_V$), taken relative to the aircraft.

18 Claims, 6 Drawing Sheets

(56) References Cited

OTHER PUBLICATIONS

Moller, H., et al. "Synthetic Vision for Enhancing Poor Visibility Flight Operations," IEEE Aerospace and Electronic Systems Magazine, IEEE Service Center, Piscataway, NJ (US), vol. 9, No. 3 (Mar. 1994), pp. 27-33.

Search Report for French Application No. FR 12 02674, dated May 31, 2013.

* cited by examiner

AIRCRAFT VISION SYSTEM, AND ASSOCIATED VISION METHOD

CROSS-REFERENCE TO RELATED APPLICATIONS

This application claims benefit of French patent application serial number FR 12 02674, filed Oct. 5, 2012, which is herein incorporated by reference.

BACKGROUND OF THE INVENTION

1. Field of the Invention

The present invention relates to a hybrid vision system for an aircraft, comprising:

a display;

an assembly for dynamically generating synthetic images, the synthetic images comprising at least one synthetic surface representation of the terrain situated facing the aircraft;

a graphic interface management assembly for the display, capable of controlling the dynamic display, on a first region of the display, of a synthetic image coming from the synthetic image generating assembly, the first region being delimited by an edge, the management assembly being capable of maintaining, in certain movement configurations of the aircraft, a second region of the display delimited by the edge substantially with no synthetic surface representation of the terrain.

2. Description of the Related Art

Such a system is designed to be installed in the cockpit of an aircraft to be associated with a display of the cockpit. The display is for example an at least partially transparent display, such as a semitransparent screen placed in front of the windshield of the cockpit, a system for projecting images on the windshield of the cockpit, a semitransparent sunshade, a helmet visor, or semitransparent glasses close to the eye.

Alternatively, the display is a head-down screen integrated into the dashboard of the cockpit.

To facilitate piloting the aircraft, and to give the pilot overall information on the structure of the terrain situated facing the aircraft, it is known to generate synthetic images of the countryside situated in front of the aircraft, in particular from topographical databases, based on the current position of the aircraft determined by the aircraft's navigation system.

The synthetic images are representative of the environment situated in front of the airplane, as it may be observed through the windshield by a pilot in the cockpit. These synthetic images generally comprise a synthetic surface representation of the terrain.

Such a vision system allows the pilot to visualize the relief that may be located in front of the aircraft, in particular when visibility is low or nonexistent.

Such vision systems provide substantial assistance to pilots, but are sometimes inaccurate, in light of possible errors in the positioning of the aircraft and/or in the topographical data available in the databases. It is therefore necessary to have, in parallel, a real vision of the environment located outside the aircraft.

To that end, enhanced vision systems (EVS) have been developed.

These systems generally comprise a camera placed onboard in the nose cone of the aircraft. The camera, which for example includes sensors operating in the infrared, improves the visibility in front of the aircraft, by detecting the terrain and all structures present on the terrain, for example such as lights present on the runway or around the runway, in particular approach ramp lights.

Based on the image data collected by the camera, a real image of the environment present in front of the aircraft is obtained.

Such vision systems therefore make it possible to confirm the position of the runway relative to the aircraft and/or relative to the environment, and facilitate the pilot's decision when he reaches the decision altitude, at which he must choose whether or not to continue landing.

Hybrid vision systems have also been developed. These systems display both a first region comprising a completely synthetic image, and a second region comprising a real image obtained from an enhanced vision system comprising an infrared camera.

In known systems, the display includes a central region, in which the data from the improved viewing sensor is integrated, and a peripheral region, in which a synthetic image is displayed.

Such a system facilitates piloting of the vehicle under good visibility conditions. However, when visibility is lower, the display in the central window is of lower quality, which may make it difficult for the pilot to assess the content of the image present on a large portion of the screen.

SUMMARY OF THE INVENTION

One aim of the invention is therefore to obtain a viewing system for an aircraft, which combines synthetic images with a real view, while offering better quality information to the pilot relative to the conditions in which the aircraft is traveling.

To that end, the invention relates to a system of the aforementioned type, characterized in that the management assembly includes means for dynamically delimiting the edge of the first region, the delimiting means being configured to compute the position of the edge of the first region on the display dynamically as a function of a determined visibility distance, taken relative to the aircraft.

The system according to the invention may comprise one or more of the following features, considered alone or according to any technically possible combination:

the management assembly can control the display of the first region to be located above the second region, the edge of the first region downwardly delimiting the first region;

it comprises an assembly for generating real images of the terrain situated facing the aircraft, comprising at least one detection sensor, the management assembly being capable of controlling the dynamic display, in the second region, of a real image of the terrain situated facing the aircraft, simultaneously with the display of a synthetic image in the first region;

the management assembly is capable of maintaining the first region of the display with no real images created by the real image generating assembly;

it includes a member for manually adjusting the determined visibility distance, which can be actuated by a user of the vision systems;

it includes an assembly for automatically determining the determined visibility distance;

the automatic determination assembly includes means for analyzing a real image obtained from the aircraft to define the position to which useful information can be observed on the real image, and means for computing the determined visibility distance, as a function of the position of the useful information on the real image, of the position of the aircraft, and a topographical database containing information regarding the terrain;

the delimiting means include:

means for computing the intersection between a sphere of equal radius or depending on the determined visibility difference, and the terrain situated facing the aircraft, or between a plane situated horizontally at an equal distance or depending on the determined visibility distance and the terrain situated facing the aircraft;

means for computing the position of the edge of the first region on the display as a function of the intersection determined by the intersection computation means;

the management assembly is capable to switch between a first configuration, in which it controls the display of the first region comprising a synthetic image over substantially all of the display, and a second configuration, in which it controls the display of the first region comprising the synthetic image to occupy a first part of the display, the second region substantially having no synthetic surface representation of the terrain occupying a second part of the display;

the display is an at least partially transparent display, such as a semitransparent screen placed in front of the windshield of the cockpit, a system for projecting images on the windshield of the cockpit, a semitransparent sunshade, a helmet visor or semitransparent glasses close to the eye;

it includes a member for adjusting the opaqueness of the display, advantageously situated on a control lever of the aircraft, such as the control stick or the throttle.

The invention also relates to a vision method in an aircraft, comprising the following steps:

providing a vision system as described above;

in at least one movement configuration of the aircraft, using the management assembly to dynamically display a synthetic image coming from the synthetic image generating assembly on a first region of the display, the first region being delimited by an edge, a second region of the display delimited by the edge substantially having no synthetic surface representation of the terrain;

dynamically delimiting the position of the edge of the first region as a function of a determined visibility distance, taken relative to the aircraft.

The method according to the invention may comprise one or more of the following features, considered alone or according to any technically possible combinations:

it includes a step for acquiring real image data using a real image generating assembly, then a step for generating a real image from the image data taken by the real image generating assembly, the method including the dynamic display, by the management assembly, of a real image obtained from the image data from the real image generating assembly in the second region;

during the step for dynamically displaying a real image in the second region, the management assembly maintains the first region of the display without any real images created by the real image generating assembly;

the delimiting of the position of the edge of the first region includes computing the intersection between a sphere of equal radius or depending on the visibility distance and the terrain or between the plane situated horizontally at an equal distance or depending on the determined visibility distance and the terrain, then computing the position of the edge on the display as a function of the intersection determined in the step for computing the intersection.

The invention also relates to a vision system comprising:

a display that is at least partially transparent, such as a semitransparent screen placed in front of a windshield of the cockpit, a system for projecting images on the windshield of the cockpit, a semitransparent sunshade, a helmet visor, or semitransparent glasses close to the eye;

an assembly for dynamically generating images, the synthetic images comprising at least one synthetic surface representation of the terrain situated facing the aircraft;

a management assembly for the graphic interface of the display, capable of controlling the dynamic display on at least one first region of the display of an image coming from the image generating assembly, characterized in that the system includes a member for adjusting the opaqueness of the display situated on a control knob of the aircraft, such as the control stick or the throttle.

The system may comprise one or more of the above features.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

The invention will be better understood upon reading the following description, provided solely as an example, and done in reference to the appended drawings, in which:

FIG. 1 is a diagrammatic view of a vision system of an aircraft according to the invention; The invention will be better understood upon reading the following description, provided solely as an example, and done in reference to the appended drawings, in which:

DETAILED DESCRIPTION

Figure 1:
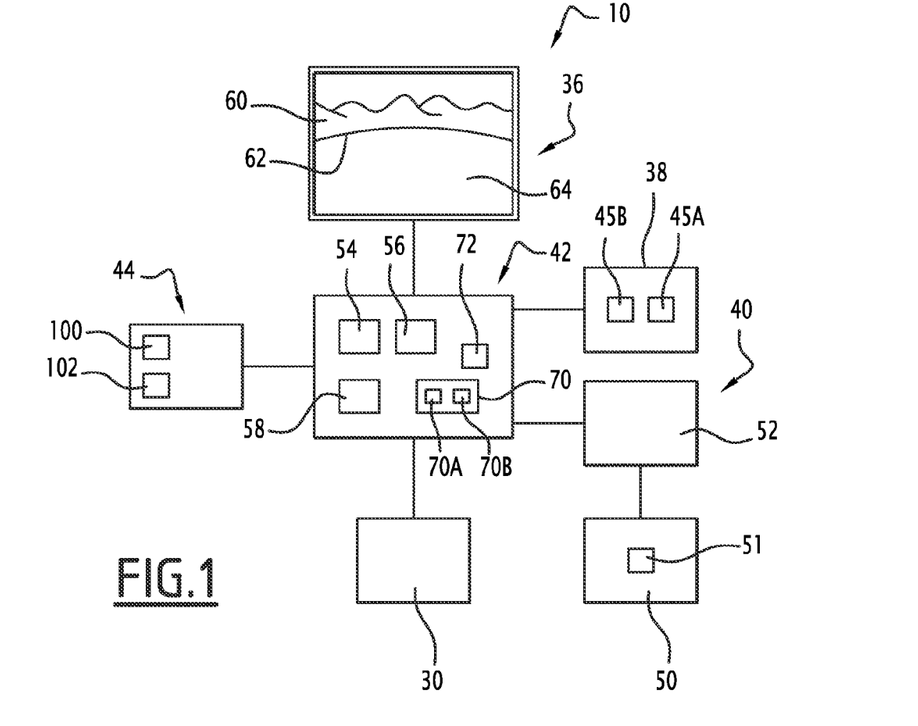

A first vision system 10 for an aircraft 12 according to the invention is diagrammatically illustrated by FIG. 1.

Figure 2:
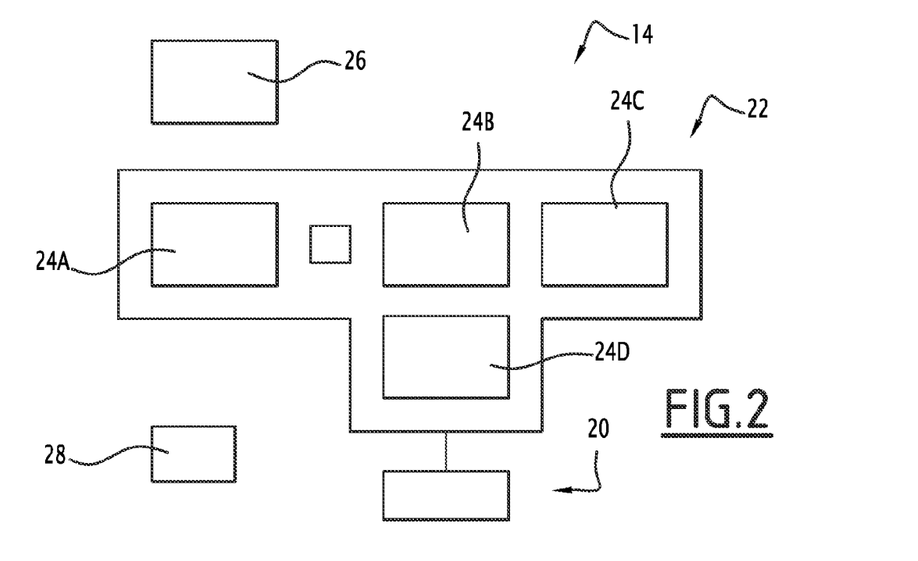
FIG. 2 is a is a diagrammatic view of a cockpit in which the vision system is implemented.
Figures 3, 4, 10:
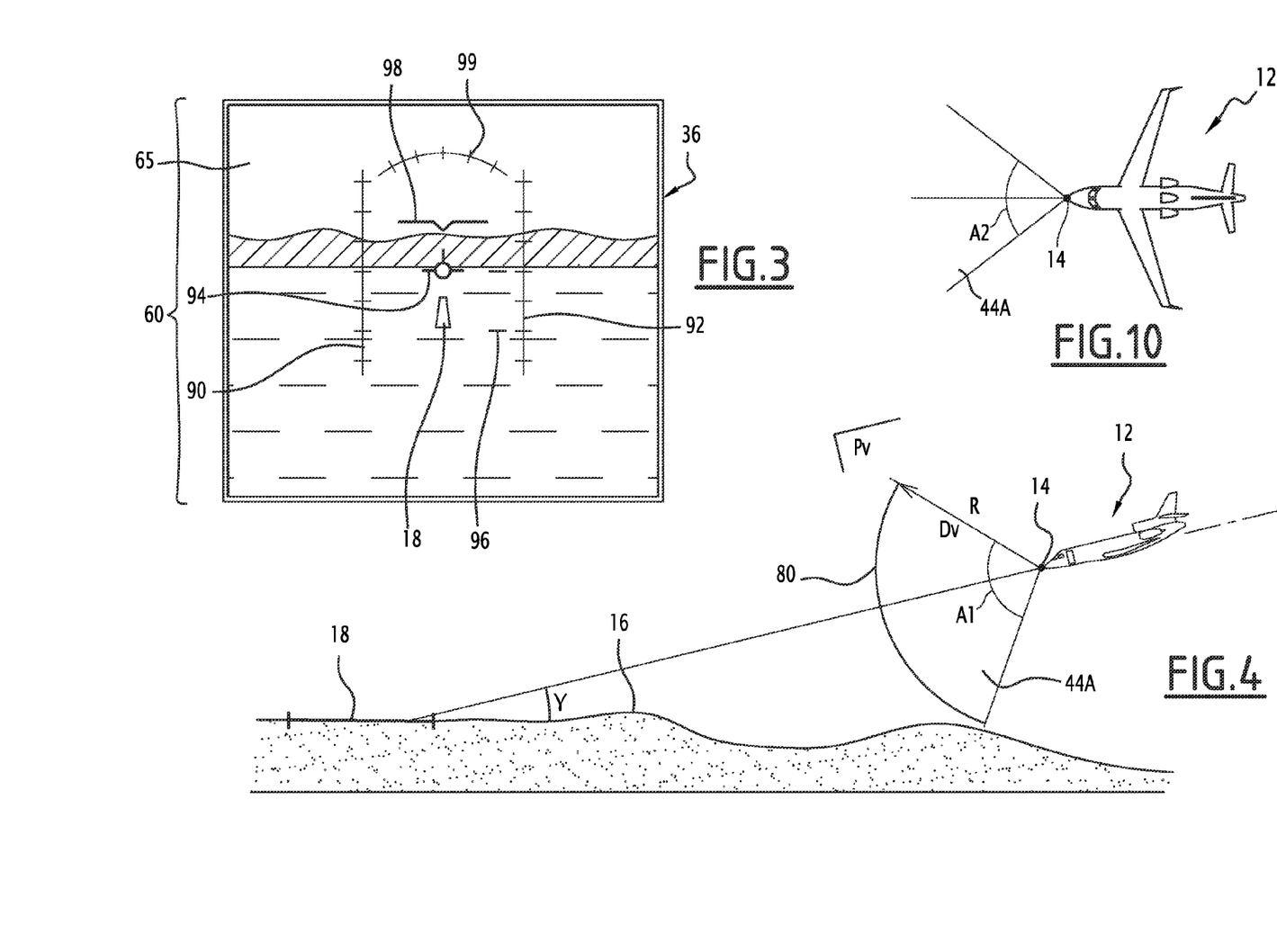
FIG. 3 is a view of a display of the system of FIG. 1, in a first display configuration in which a synthetic image occupies substantially the entire screen.
FIG. 4 is a diagrammatic view of the movement of the aircraft in the first configuration.
FIG. 10 is a top view of the aircraft during its movement.

The system 10 is designed to be mounted in an aircraft 12 diagrammatically shown in FIG. 4, to allow the display of information on the display present in the cockpit 14 of the aircraft, diagrammatically shown in FIG. 2.

Figures 7, 8:
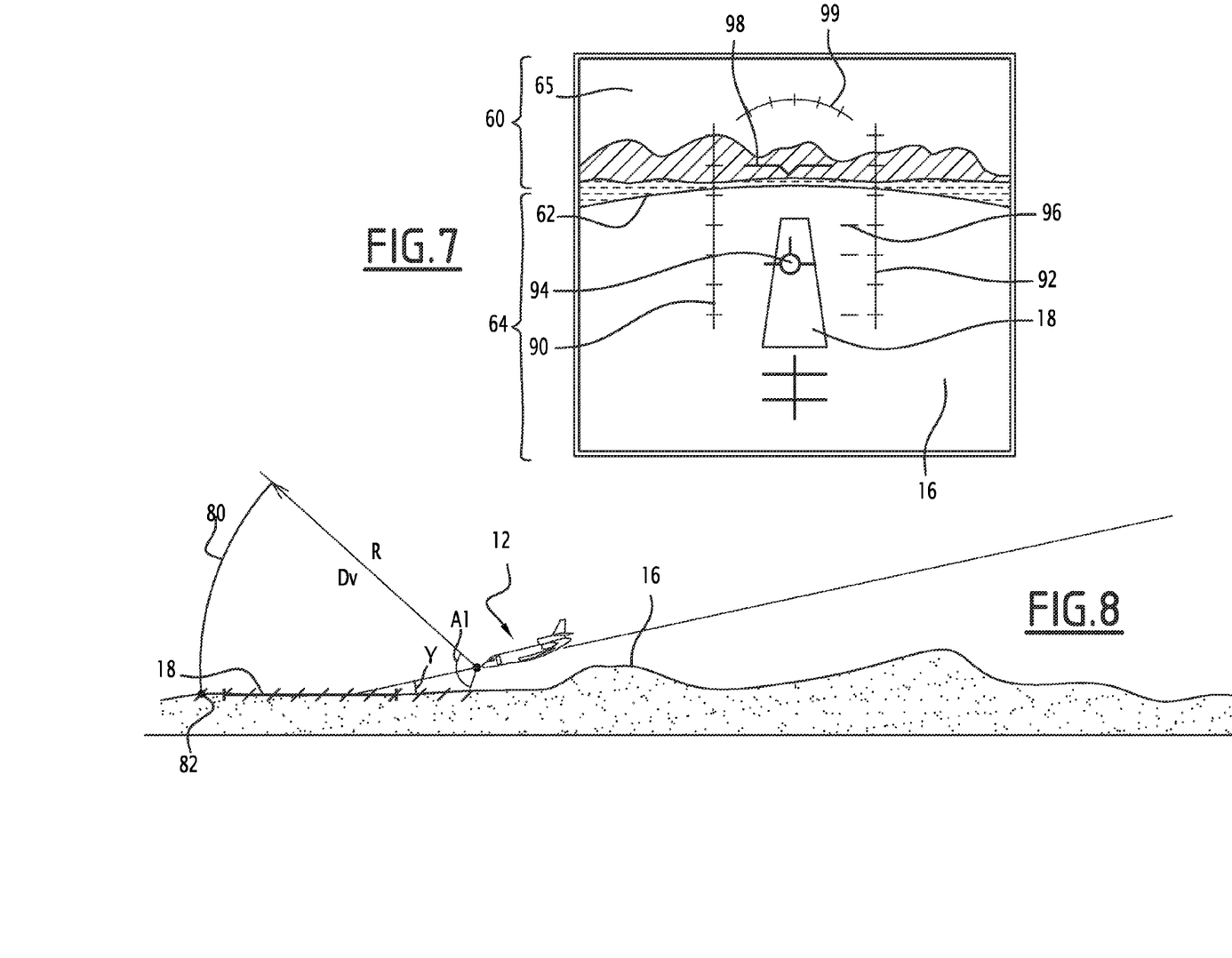
FIG. 7 is a view similar to FIG. 3, in a third display configuration.
FIG. 8 is a view similar to FIG. 4 of the movement of the aircraft in the third configuration.

The system 10 is designed to assist the pilot of the aircraft in visualizing the terrain 16 situated facing the aircraft 12, for example such as near a landing runway 18 present on the terrain 16 (visible in FIG. 7). More generally, the system 10 applies to other flight phases, for example take-off or cruise.

In reference to FIG. 2, the cockpit 14 is provided with a primary display system 22 connected to a central avionics unit 20.

The primary system 22 allows the crew to pilot the aircraft, manage its navigation, and monitor and control the various functional systems present in the aircraft. The system 22 includes a dashboard provided with a plurality of base screens 24A to 24D forming head-down displays.

In this example, the cockpit 14 is also advantageously provided with a semitransparent head-up display 26, placed facing the windshield.

The cockpit 14 is also provided with a control member 28 for piloting the aircraft, such as a lever or control stick.

In a known manner, the base screens 24A and 24C are for example primary display screens designed to display flight parameters of the aircraft. The base screens 24B and 24D are for example multifunctional navigation and/or monitoring and control screens of the avionics systems.

The primary display system 22 is provided with a display management assembly (not shown) capable of displaying the different windows present on the screens 24A to 24D.

The central avionics unit 20 is connected to a measurement and spatial positioning system 30 of the aircraft 12.

The measuring and positioning system 30 for example includes sensors measuring parameters outside the aircraft such as the temperature, pressure or speed, sensors measuring parameters inside the aircraft and its various functional systems, and positioning sensors, such as GPS sensors, inertial navigation units and/or an altimeter.

The positioning sensors are capable of providing information on the geographical position of the aircraft, its speed, its heading and its attitude (pitch attitude, roll angle).

In reference to FIG. 1, the vision system 10 according to the invention is connected to the measurement and positioning system 30. It is advantageously connected to the central avionics unit 20.

The vision system 10 includes at least one display 36, an assembly 38 for generating synthetic images, and advantageously, an assembly 40 for generating real images.

It also includes a management assembly 42 of the graphic interface of the display 36 connected to each of the assemblies 38, 40 and the positioning system 30.

The system 10 further includes a man-machine interface 44 for adjusting the parameters of the display on the display 36.

The display 36 is for example one of the screens 24A to 24B and/or is the semitransparent head-up display 26 of the cockpit 14. In other alternatives, the display 36 is for example a system for projecting images on the windshield of the cockpit, a semitransparent sunshade, a helmet visor or semitransparent glasses close to the eye.

In a first embodiment that will be described hereafter, the display 36 of the vision system 10 according to the invention is the semitransparent head-up display of the cockpit 14.

In that case, the display 36 can be made partially transparent to allow viewing of the environment situated in front of the display 36, transparently. The display 36 can be made at least partially opaque by displaying synthetic images or real images generated by one of the generating assemblies 38, 40, and provided by the management assembly 42, as will be described below.

The dimensions of the display 36 correspond to an observation volume 44A in the space situated in front of the aircraft 12, defined substantially by a pyramid.

In reference to FIG. 4 and FIG. 10, the observation volume 44A has a vertical opening angle, along a vertical axial plane of the aircraft 12, equal to A1 and a horizontal opening angle equal to A2 in a horizontal axial plane of the aircraft in a reference related to the aircraft 12.

The opening angle A1 is defined while excluding the regions of the terrain 16 that are not visible by the pilot due to the structure of the cockpit and the pitch attitude of the aircraft 12.

The assembly 38 for generating synthetic images is connected to the management assembly 42. It includes a memory and a processor.

It includes at least one database 45A contained in the memory comprising topographical data associated with the terrain above and in front of which the aircraft 12 is moving.

It further includes a model 45B for generating images, capable of dynamically creating synthetic images of the terrain situated facing and in front of the aircraft, based on the current geographical position of the aircraft 12, and its attitude (in particular heading, pitch attitude, pitch angle, yaw), as determined using the positioning system 30 and based on the topographical data coming from at least one of the databases 45A.

To that end, the database(s) 45A are chosen from among terrain, obstacle, navigation, geopolitical, airspace usage, and terrain type (expanses and streams of water, land areas, etc.) databases.

The module 45B is thus capable of creating, at any given moment, a synthetic surface image that corresponds to a visual representation of the environment that could be observed by the pilot through the windshield at that given moment, when the aircraft is in a given geographical position and attitude.

The synthetic image can partially cover the observation volume 44A defined by the dimensions of the display 36.

It in particular forms a synthetic surface representation of the terrain present in front of the aircraft and its relief.

This representation, in two dimensions on the display 36, makes up at least one of the regions of the display 36 in the form of filled surfaces that correspond to terrain areas and/or the relief present in those areas.

The synthetic image of the terrain may comprise aeronautic data such as airports and their landing runways and/or geographic references such as towns or expanses of water (rivers, lakes, seas).

The filling of the synthetic image with opaque or partially opaque pixels is advantageously greater than 50% of the total surface area of the image.

In the example illustrated in FIG. 1, the aircraft 10 further includes an assembly 40 for generating real images in front of the aircraft.

This generating assembly 40 includes at least one measuring sensor 50, such as a camera 51, and a module 52 for generating real images connected to the sensor 50.

Alternatively, the assembly 40 includes a plurality of sensors 50 operating at different wavelengths.

The sensor 50 is for example a visible or infrared camera or a camera in the millimetric domain that is mounted on or near the nose cone of the aircraft 12.

The assembly 40 for generating real images is calibrated to observe the space situated in front of the aircraft in a viewing field preferably corresponding to the observation volume 44A. It is capable of measuring and dynamically providing the module 52 with periodic image data observed at a given resolution in its viewing field.

The module 52 is capable of dynamically processing the periodic image data received from the or each sensor 50 to form a real image at each moment, obtained from image data detected by the or each sensor 50, to be displayed on the display 36.

The assembly 42 for managing the interface for example includes a processor 54 and a memory 56. It includes means 58 for managing the display of images on the display 36.

Figures 5, 6:
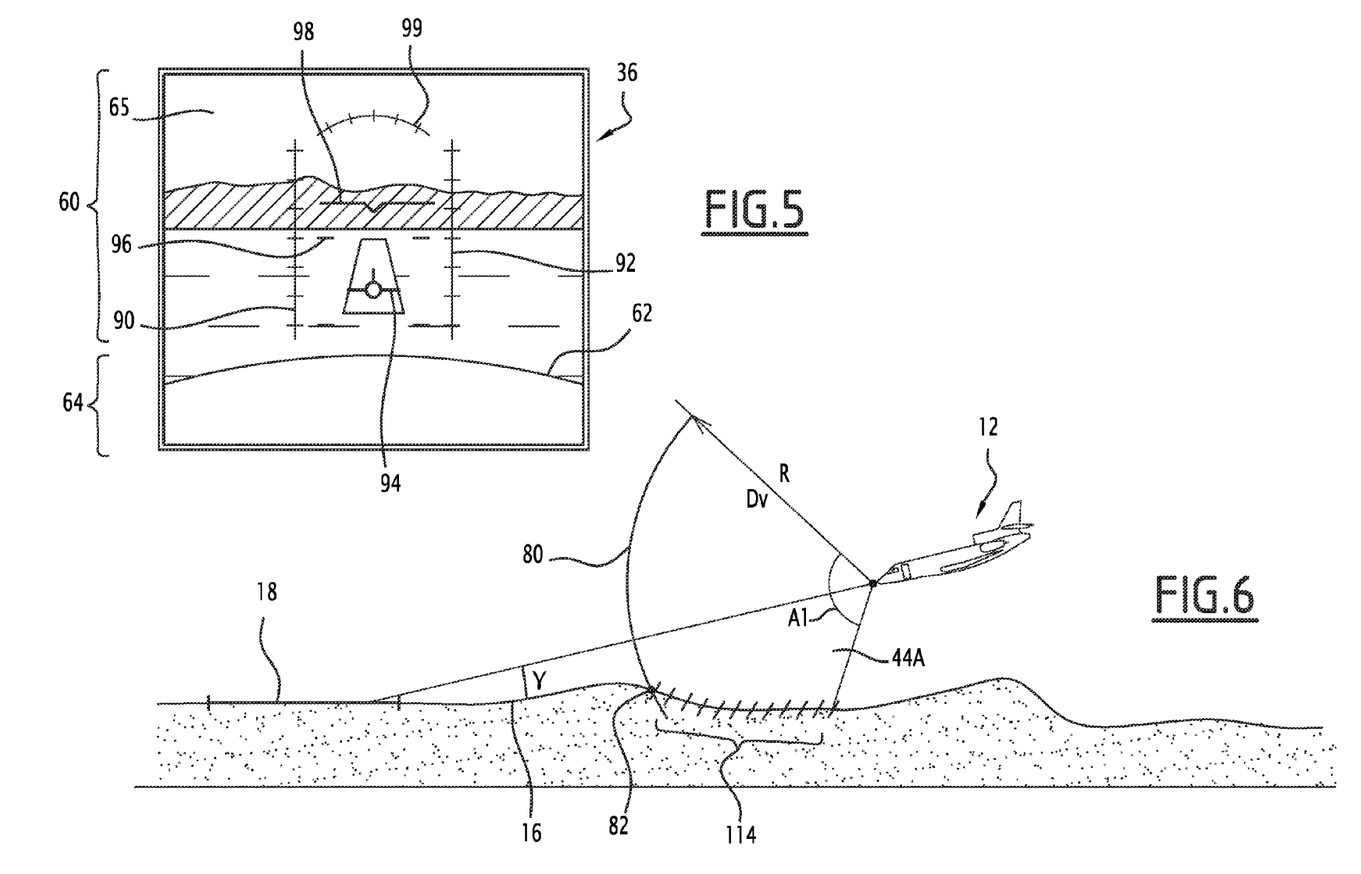
FIG. 5 is a view similar to FIG. 3, in a second display configuration in which a first region of the display includes a synthetic image and a second region has substantially no synthetic surface representation of the terrain.
FIG. 6 is a view of the movement of the aircraft in the second configuration.

In reference to FIG. 5, the management means 58 can dynamically display, in a first region 60 of the display 36, a synthetic image coming from the synthetic image generating assembly 38, the first region 60 being delimited by an edge 62. The synthetic image comprises at least one synthetic surface representation of the terrain 16.

The management means 58 are further capable of maintaining, at least in certain movement configurations of the aircraft (see FIGS. 5 and 7), a second region 64 of the display 36 with no synthetic surface representation of the terrain 16, the second region 64 being delimited by the edge 62.

According to the invention, the management assembly 42 further includes means 70 for dynamically delimiting the edge 62 of the first region 60 based on a visibility distance $D_V$.

The visibility distance $D_V$ advantageously depends on the distance $D_0$ at which the pilot's eye or the real image generating assembly 40 is able to provide usable information in real observation.

According to the invention, this visibility distance $D_V$ is adjusted by the user, or is obtained automatically by the management assembly 42.

In one embodiment, no image or synthetic surface representation of the terrain 16 is displayed in the second region 64. The pilot can then transparently observe, through the display 36, the space situated in front of the aircraft in the second region 64.

In one alternative, the control means 58 of the display can dynamically display, in the second region 64, a real image obtained from the real image generating assembly 40.

In the example shown in the figures, the second region 64 can be displayed by the management means 58 below the first region 60. The edge 62 then forms a lower edge of the first region 60 that extends through the display 36.

In a first display configuration shown in FIG. 3, the edge 62 is situated at the bottom of the display 36. The first region 60 then covers the entire display 36. No second region 64 is then present below the first region 60.

In a second display configuration shown in FIG. 5, the edge 62 has moved upward on the display 36, like a moving curtain, and the second region 64 is situated below the first region 60.

In reference to FIGS. 4, 6 and 8, the means 70 for dynamically delimiting the edge 62 for example include means 70A for determining the intersection 82 between a sphere 80 centered on the aircraft 12, with a radius equal to or depending on the visibility distance $D_V$, and the terrain 16 situated facing the aircraft.

The delimiting means 70 further include means 70B for computing the position of the edge 62 on the display 36 as a function of the determined intersection 82.

These means 70B are capable of converting a computed topographical position of the intersection 82 into a display position of the edge 62 on the display 36.

Advantageously, the management assembly 42 further includes means 72 for controlling the display of symbols representative of flight parameters, superimposed on the first region 60 and/or on the second region 62.

The control means 72 are for example capable of displaying alphanumeric information, analog information such as scales and/or controls to be actuated by the user.

The symbols are for example representative of at least one of the following parameters: altitude indicator, horizontal situation indicator, airspeed, altitude, vertical speed, corrected airspeed, engine information, lift configuration of the aircraft, etc.

In the example illustrated in FIG. 3, the control means 72 are capable of displaying, on the display 36, independently of the position of the regions 60, 64, a speed scale 90, an altitude scale 92, a symbol 94 or model representing the position of the aircraft 12 and its pitch attitude, a pitch attitude scale 96, a zero pitch attitude indicator 98, and a heading indicator 99.

The man-machine interface 44 includes a first member 100 for adjusting the selected visibility distance $D_V$. Advantageously, it further includes a member 102 for adjusting the brightness of the display of the synthetic image and optionally the brightness of the real image respectively displayed in the first region 60 and the second region 64.

The first adjusting member 100 is for example formed by a maneuvering member present in the cockpit 14, such as a button or a knob. Alternatively, the adjusting member 100 is formed by a software interface for selecting a visibility distance that can be displayed on a screen, and controllable using a keyboard and/or mouse.

The visibility distance $D_V$ is then adjusted manually, by acting on the adjustment member 100.

This visibility distance $D_V$ can be chosen relative to a real distance $D_o$ observed or estimated by the pilot of the aircraft 12, by a visibility distance measured on the ground and sent to the aircraft 12 by the communication system 32, or by any other means.

The visibility distance is for example chosen between 60 m and 80 km.

In the example illustrated in FIG. 6, the visibility distance $D_V$ is computed relative to the aircraft 12, along the axis and pitch attitude of the aircraft 12.

The visibility distance $D_V$ used by the system 10 may be a multiple k of the real distance $D_0$ observed or estimated by the pilot of the aircraft 12 or measured on the ground.

The determined visibility distance $D_V$ is for example computed using the equation:

$$D_V = k \cdot D_0,$$

where k is for example comprised between 0.8 and 2. In particular, when a real image generating assembly 40 is used to form the real image presented in the second region 64, k may be strictly greater than 1. The distance $D_V$ therefore makes it possible to account for the resolution of the sensors 50, which may be higher than that of the human eye.

The second adjusting member 102 can adjust the opaqueness of the image displayed in the first 60 and/or second 64 region. This control is for example a button or knob present on the dashboard of the cockpit 14.

Figure 9:
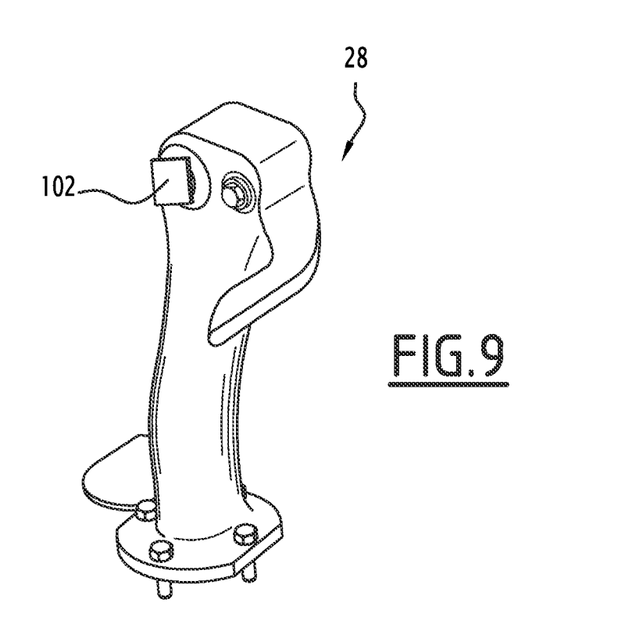
FIG. 9 is a partial perspective view of an aircraft control knob, equipped with a brightness adjusting member.

In one advantageous alternative illustrated in FIG. 9, the second adjusting member 102 is mounted on the flight control member 28, serving to maneuver the aircraft 12.

Thus, the brightness or opaqueness of the image can be adjusted by the pilot using a real-time control. This control, situated on the control stick or knob constituting the control member 28, makes it possible to adjust the opaqueness of the image at any time, in particular during the critical flight phases where the hands must remain on the control member 28. The brightness of the screen is thus chosen such that the display does not interfere with the view of the outside world.

This is in particular the case at the end of the approach, to favor natural vision relative to the synthetic image, and relative to the real image obtained from the assembly 40.

In another alternative, the adjusting member 102 is formed by a software selection interface that can be displayed on a screen and controlled using a keyboard and/or a mouse.

A first viewing method according to the invention will now be described in reference to the approach of an aircraft 12 toward a landing runway 18 located on a terrain 16.

Initially, when the system 10 is activated, the dimensions of the display 36 correspond to the observation volume 44A in the space situated in front of the aircraft 12, previously defined.

At each update moment T of the display of the system 10, for example at a frequency above 5 Hz and comprised between 5 Hz and 60 Hz, the delimiting means 70 determine the position of the edge 62 of the first region 60.

To that end, the computation means 70A determine, at each moment T, the current position of the aircraft 12 based on data received from the positioning system 30. The computation means 70A next determine the topographical configuration of the terrain 16 situated in front of the aircraft, and in particular the relief present on that terrain. Then, the computation means 70A note the intersection 82 between a sphere 80 centered on the cockpit 14 of the aircraft 12, with a radius equal to the visibility distance $D_V$ or depending thereon, and the terrain 16, as it is determined by its topographical configuration.

Advantageously, the radius $D_V$ of the sphere 80 is chosen equal to $k \cdot D_0$, where k is a proportionality factor chosen between 0.8 and 2, and $D_0$ is an estimate of a real visibility distance, observable over the terrain. The factor k is in particular chosen to be strictly greater than 1, when a real image coming from a real image generating assembly 40 is displayed in the second region 64 to account for the improved resolution of that real image generating assembly 40 with respect to visibility by the naked eye.

In the first movement configuration of the aircraft shown in FIG. 4, the intersection between the sphere 80 and the terrain 16 is zero or is situated outside the observation volume 44A.

In that case, the means 70 for determining the position of the edge 62 place the edge 62 along the lower edge of the display 36 to define a first region 60 that substantially occupies the entire display 36 (FIG. 3).

At the same time, the synthetic image generating assembly 38 dynamically creates, at each moment T, a synthetic image based on the current position of the aircraft, as determined by the positioning system 30.

As illustrated by FIG. 3, the management means 58 collect the synthetic image created by the synthetic image generating assembly 38, and thus display, over substantially the entire region of the display 36 in which the terrain 16 is observable, that synthetic image representative of the terrain situated in front of the aircraft 12.

The synthetic image thus displayed includes at least one synthetic surface representation of the terrain 16.

Advantageously, the control means 72 display the different symbols 90 to 99 superimposed on the synthetic image.

In this example, the synthetic image further comprises a symbolic representation of the runway 18 in the form of a quadrilateral surrounding the runway, in the presumed determined position of that runway 18 on the terrain 16.

Then, in the configuration of FIG. 6, when the aircraft 12 comes closer to the terrain 16, the intersection 82 between the sphere 80 and the terrain enters an observation volume 44A. The part 114 of the terrain 16 situated in the observation volume 44A behind the intersection 82 defines an area potentially visible to the naked eye or by a real image generating assembly 40, since that part 114 is situated at a smaller distance than the estimated or real visibility distance $D_V$ (when that distance is corrected by a factor k).

Based on the dynamic topographical position of the intersection 82, the computation means 70B compute the corresponding position of that intersection on the display 36 based on the orientation of the viewing field displayed by the display.

The position of the edge 62 is then computed from the position of the intersection on the display 36. The position of the intersection and the position of the edge 62 can be at least partially equal, in particular in the areas of the intersection that are not concealed by a relief of the terrain 16, observing from the cockpit 14.

It is possible, in certain cases, to correct the position of the edge 62 as a function of the relief present on the terrain 16 in front of the aircraft 12.

Advantageously, different intersections are computed for each column of the display 36 corresponding to a vertical section in the observation volume 44A. This makes it possible to determine the minimum distance on each column where the intersection is found, and optionally to correct the position of the edge 62 as a function of that computation.

Other corrections of the position of the edge 62 may be applied by the computation means 70B, for example such as smoothing, the computation of the sliding average of the positions of the edge, etc.

Once the dynamic position of the edge 62 on the display 36 is obtained at each moment T as a function of the visibility distance $D_V$, the management means 58 of the display display, in the first region 60 situated above the edge 62, the synthetic image coming from the synthetic image generating assembly 38. The synthetic image includes at least one synthetic surface representation of the terrain 16.

Furthermore, the management means 58 maintain the second region 64 situated below the edge 62 without a synthetic surface representation of the terrain 16.

For example, the complete synthetic image generated by the generating assembly 38 is truncated by the management means 58 so as to be displayed only above the dynamically determined edge 62.

In one embodiment, no real image is displayed on the display 36.

The pilot of the aircraft can observe the space and the terrain 16 situated facing the second region 64 transparently through the display 36.

In one alternative, the real image generating assembly 40 notes, at each moment, a plurality of image data in the observation volume 44A. The module 52 then generates a real image from image data from the assembly 40.

This real image coming from the real image generating assembly 40 is displayed in the second region 64 as far as the edge 62.

Advantageously, the real image obtained from the generating assembly 40 is truncated so as to be displayed only in the second region 64 up to the edge 62. In that case, the first region 60 has no display of real images created by the generating assembly 40.

Alternatively, the real images created by the generating assembly 40 are displayed both in the first region 60 and in the second region 64, the synthetic images being displayed superimposed on the real images in the first region 60.

Furthermore, a third region 65 situated above the first region 60, representative of the sky present above the terrain 16, may be less transparent.

Owing to the system 10 according to the invention, in the regions where visibility is considered to be of good quality, the pilot therefore directly accesses, on the display 36, a real observation of the terrain situated facing the aircraft 12, either directly transparently, or through a real image provided by a real image generating assembly 40.

However, in the space situated beyond the possible visibility, the pilot has a synthetic image that allows him to anticipate the relief present in that region.

The delimiting means 70 dynamically determine, at all moments, the position of the edge 62 of the first region 60 as a function of the visibility distance $D_V$, advantageously using the computation of the intersection between the sphere 80 and the terrain 16.

As the aircraft 12 descends, and the terrain 16 and the aircraft come closer together, a larger portion of the terrain 16 passes below the visibility distance $D_V$. Subsequently, the edge 62 moves upward on the display 36, in light of the approach between the aircraft 12 and the terrain 16.

As a result, in reference to FIG. 7, when the aircraft 12 arrives near the landing runway 18, the second region 64 overlaps the landing runway 18 and the front area adjacent to that runway 18. The pilot then has a real view of the landing runway 18 and its approach ramps, that real image being obtained by direct observation transparently through the display 36, or using a real image generating assembly 40.

However, the terrain elements 16 situated in the background, in particular the distant relief, are shown in the form of a synthetic image that allows the pilot to visualize the environment around the aircraft 12, if unforeseen events occur during landing, which may require a go-around.

Owing to the dynamic determination of the position of the edge 62 of the first region 60 in which a synthetic image is displayed on the display 36 as a function of a visibility distance $D_V$, and owing to the lack of synthetic image display in the second region 64 situated below the edge 62, the pilot has the most reliable and precise data at all times to estimate the spatial situation of the terrain situated facing the aircraft 12.

Figures 11, 12:
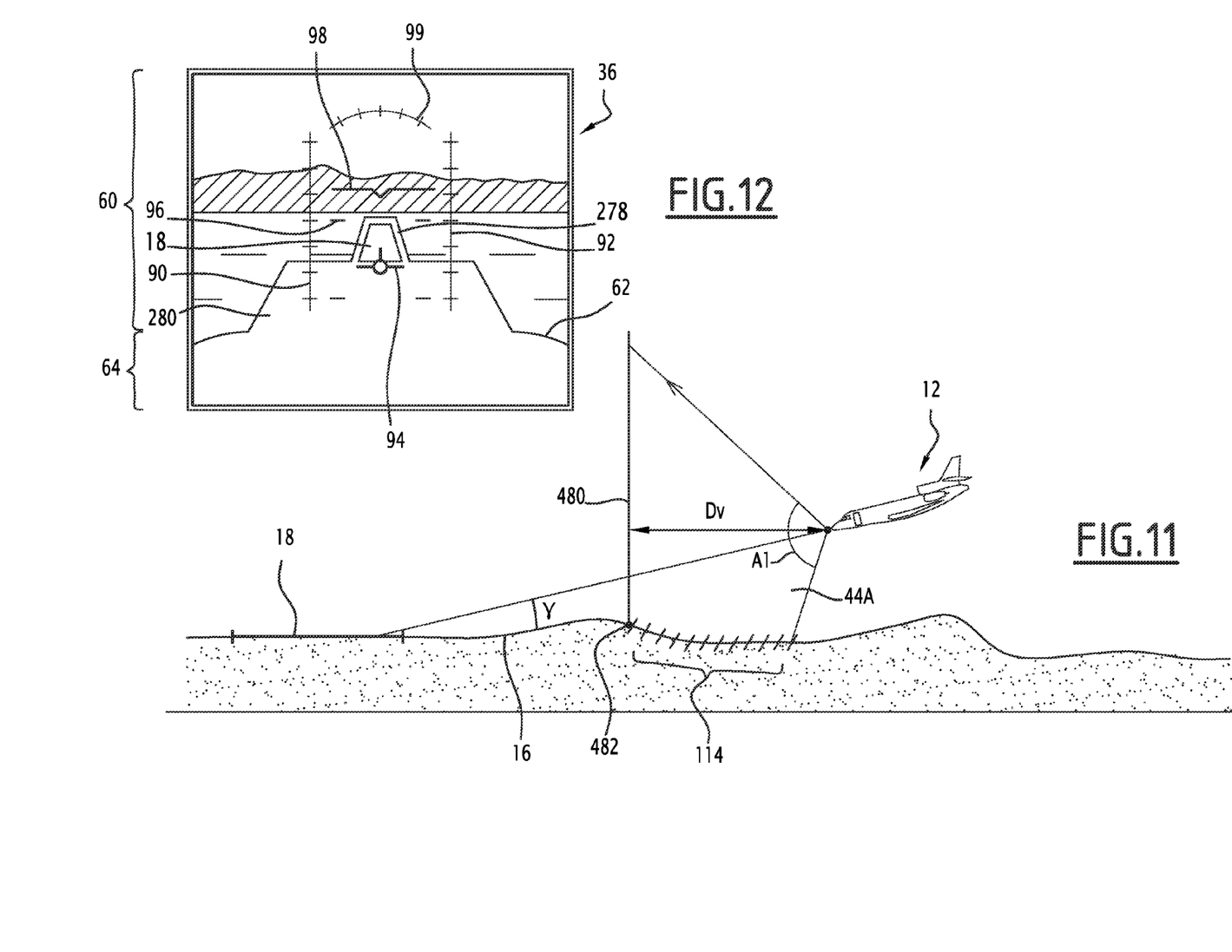
FIG. 11 is a view similar to FIG. 6, illustrating one alternative embodiment of the method according to the invention.
FIG. 12 is a view similar to FIG. 5, illustrating another alternative embodiment of the method according to the invention.

In the alternative shown in FIG. 11, the visibility distance $D_V$ is computed horizontally, without accounting for the pitch attitude of the aircraft 12. The position of the edge 62 is then calculated based on the intersection 482 between a vertical plane 480 situated horizontally at a distance $D_V$ from the aircraft 12 and the terrain 16.

In the alternative shown in FIG. 12, certain specific elements situated in the first region 60 may be left without the display of a synthetic surface representation of the terrain 16, while optionally having a display of a real image.

These particular elements are for example the inside of the symbol depicting the runway 18, a peripheral area 278 around the runway 18 and/or a front area 280 situated in front of the runway, as illustrated by FIG. 12.

In that case, the front area 280 may have a larger width than that of the peripheral area 278 and the runway 18, as in the example illustrated in FIG. 12.

Conversely, the second region 64 may comprise a plurality of synthetic indicators, such as reference points, terrain lines obtained from the database 45A. This region 64, however, lacks any synthetic surface representation of the terrain 16.

In another alternative, the opaqueness of the synthetic image displayed in the first region 60 is less than 100%, and in particular comprised between 1% and 99%, to allow partial observation of the terrain situated behind the display 36.

In still another alternative, the display 36 of the vision system 10 according to the invention is chosen from among one or more head-down screens 24A to 24D. In that case, the management assembly 42 displays, in the second region 64, a real image provided by the real image generating assembly 40.

In another alternative, the visibility distance $D_V$ is determined automatically by the system 10 using an automatic determining assembly for determining the visibility distance $D_V$.

The determining assembly is capable of analyzing a real image obtained from a real image generating assembly 40, for example using a camera 51 to define the position on the real image to which useful information can be observed on that real image. Based on the current position and the current pitch attitude of the aircraft 12, for example measured by a positioning sensor and as a function of information regarding the terrain 16, contained in a topographical database 45A, a distance $D_V$ is computed at each moment.

The determining assembly is capable of analyzing a real image obtained from a real image generating assembly 40, for example using a camera 51 to define the position on the real image to which useful information can be observed on that real image. Based on the current position and the current pitch attitude of the aircraft 12, for example measured by a positioning sensor and as a function of information regarding the terrain 16, contained in a topographical database 45A, a distance $D_V$ is computed at each moment.

While the foregoing is directed to embodiments of the present invention, other and further embodiments of the invention may be devised without departing from the basic scope thereof, and the scope thereof is determined by the claims that follow.

The invention claimed is:

1. A vision system for an aircraft, comprising:
  a display;
  a synthetic image generator for dynamically generating synthetic images, the synthetic images comprising at least one synthetic surface representation of the terrain situated facing the aircraft; and
  a graphic interface manager for the display, capable of controlling the dynamic display, on a first region of the display, of a synthetic image coming from the synthetic image generator, the first region being delimited by an edge, the graphic interface manager being capable of maintaining, in at least one movement configuration of the aircraft, a second region of the display delimited by the edge substantially with no synthetic surface representation of the terrain;
  the manager including a delimiter for dynamically delimiting the edge of the first region, the delimiter being configured to compute a position of the edge of the first region on the display dynamically as a function of a determined visibility distance ($D_V$), taken relative to the aircraft.

2. The system according to claim 1, wherein the graphic interface manager is configured to control the display of the first region to be located above the second region, the edge of the first region downwardly delimiting the first region.

3. The system according to claim 1, further comprising a real image generator for generating real images of the terrain situated facing the aircraft, comprising at least one detection sensor, the graphic interface manager being capable of controlling the dynamic display, in the second region, of a real image of the terrain situated facing the aircraft, simultaneously with the display of a synthetic image in the first region.

4. The system according to claim 3, wherein the graphic interface manager is capable of maintaining the first region of the display with no real images created by the real image generator.

5. The system according to claim 1, further comprising an adjuster for manually adjusting the determined visibility distance ($D_V$), which can be actuated by a user of the vision system.

6. The system according to claim 1, further comprising an automatic determiner for automatically determining the determined visibility distance ($D_V$).

7. The system according to claim 6, wherein the automatic determiner includes an analyzer for analyzing a real image obtained from the aircraft to define the position to which useful information can be observed on the real image, and a determined visibility distance computer for computing the determined visibility distance, as a function of the position of the useful information on the real image, of the position of the aircraft, and a topographical database containing information regarding the terrain.

8. The system according to claim 1, wherein the delimiter includes:
an intersection computer for computing the intersection between a sphere of equal radius or depending on the determined visibility difference ($D_V$), and the terrain situated facing the aircraft, or between a plane situated horizontally at an equal distance or depending on the determined visibility distance ($D_V$) and the terrain situated facing the aircraft;
a position computer for computing the position of the edge of the first region on the display as a function of the intersection determined by the intersection computer.

9. The system according to claim 1, wherein the graphic interface manager is configured to switch between a first configuration, in which it controls the display of the first region comprising a synthetic image over substantially all of the display, and a second configuration, in which it controls the display of the first region comprising the synthetic image to occupy a first part of the display, the second region substantially having no synthetic surface representation of the terrain occupying a second part of the display.

10. The system according to claim 1, wherein the display is an at least partially transparent display.

11. The system according to claim 10, further comprising an adjuster for adjusting the opaqueness of the display.

12. A method of operating a visions system in an aircraft, comprising the following steps:
providing a vision system comprising:
a display;
a synthetic image generator for dynamically generating synthetic images, the synthetic images comprising at least one synthetic surface representation of the terrain situated facing the aircraft; and
a graphic interface manager for the display, capable of controlling the dynamic display;
in a movement configuration of the aircraft, using the graphic interface manager to dynamically display a synthetic image coming from the synthetic image generator on a first region of the display, the first region being delimited by an edge, a second region of the display delimited by the edge having no synthetic surface representation of the terrain;
dynamically delimiting the position of the edge of the first region as a function of a determined visibility distance ($D_V$), taken relative to the aircraft.

13. The method according to claim 12, further comprising a step for acquiring real image data using a real image generator, then a step for generating a real image from the image data taken by the real image generator, the method including the dynamic display, by the graphic interface manager, of a real image obtained from the image data from the real image generator in the second region.

14. The method according to claim 13, wherein, during the step for dynamically displaying a real image in the second region, the graphic interface manager maintains the first region of the display without any real images created by the real image generator.

15. The method according to claim 14, wherein the delimiting of the position of the edge of the first region includes computing the intersection between a sphere of equal radius or depending on the visibility distance ($D_V$) and the terrain or between the plane situated horizontally at an equal distance or depending on the determined visibility distance ($D_V$) and the terrain, then computing the position of the edge on the display as a function of the intersection determined in the step for computing the intersection.

16. The system according to claim 10, wherein the at least partially transparent display is chosen among a semitransparent screen placed in front of the windshield of the cockpit, a system for projecting images on the windshield of the cockpit, a semitransparent sunshade, a helmet visor or semitransparent glasses close to the eye.

17. The system according to claim 11, wherein the adjuster for adjusting the opaqueness of the display is situated on a control lever of the aircraft.

18. The system according to claim 17, wherein the control lever is chosen among a control stick or a throttle.

* * * * *